(12) United States Patent
Abu-Orf

(10) Patent No.: US 6,849,190 B2
(45) Date of Patent: Feb. 1, 2005

(54) METHODS FOR POLYMER ADDITION CONTROL FOR WATER TREATMENT

(75) Inventor: Mohammad Abu-Orf, Pittman, NJ (US)

(73) Assignee: USFilter Corporation, Warrendale, PA (US)

( * ) Notice: Subject to any disclaimer, the term of this patent is extended or adjusted under 35 U.S.C. 154(b) by 49 days.

(21) Appl. No.: 10/025,371

(22) Filed: Dec. 19, 2001

(65) Prior Publication Data

US 2003/0111421 A1 Jun. 19, 2003

(51) Int. Cl.[7] .................................................. C02F 1/52
(52) U.S. Cl. ...................................... 210/709; 210/739
(58) Field of Search ................................ 210/709, 710, 210/725, 727, 728, 734, 739, 96.1, 143

(56) References Cited

U.S. PATENT DOCUMENTS

| | | | | |
|---|---|---|---|---|
| 4,544,489 A | * | 10/1985 | Campbell et al. | ............ 210/709 |
| 4,675,116 A | * | 6/1987 | Hoyland | ...................... 210/709 |
| 5,003,814 A | * | 4/1991 | Crawford et al. | ............. 137/92 |
| 5,084,186 A | * | 1/1992 | Gilchrist | ...................... 210/709 |
| 5,183,562 A | * | 2/1993 | Totoki et al. | ................... 210/85 |
| 5,382,356 A | | 1/1995 | Thogho et al. | ............. 210/96.1 |
| 5,620,609 A | | 4/1997 | Field | ............................ 210/745 |
| 5,645,799 A | | 7/1997 | Shah et al. | ..................... 422/62 |
| 5,902,487 A | * | 5/1999 | Pickering et al. | ............ 210/709 |

OTHER PUBLICATIONS

Dentel et al., "Laboratory and Full–Scale Studies of Liquid Stream Viscosity and Streaming Current for Characterization and Monitoring of Dewaterability", (1995), pp. 2663–2672, Wat. Res. vol. 29, No. 12.

Papavasilopoulos et al., "On the Role of Aluminum Hydroxide in the Conditioning of an Alum Sludge", (1998), pp. 33–40, Wat. Sci. Tech. vol. 28, No. 2.

Bache, et al., "Viscous Behavior of Sludge Centrate in Response to Polymer Conditioning", (2000), pp. 354–358, Wat. Res. vol. 34, No. 1.

Abu–Orf et al., "Use of Liquid Stream Viscosity in Sludge Dewaterability Assessment: Laboratory and Full–scale Studies", (Oct. 15–19, 1994), pp. 140–152, Water Enviroment Federation 67th Annual Exhibition.

"Sludge Management Entering the 3rd Millenium", Conference Proceeding, (Mar. 25–28, 2001) pp. 1–3, International Water Association.

Abu–Orf et al., "On–Line Monitoring of Polymer Feed Using Centrate Viscosity", (Sep. 14, 2001), p. 529, Velvendi Water North American Tech. Center.

* cited by examiner

Primary Examiner—Peter A. Hruskoci
(74) Attorney, Agent, or Firm—Lowrie, Lando & Anastasi, LLP

(57) ABSTRACT

Systems and methods for polymer addition control for wastewater treatment. In a water treatment process where flocculating agents are used to promote solids aggregation, intrinsic physical properties of the liquid rich stream following separation may be continuously measured in order to control or optimize the amount of flocculating or treatment agent that is added to the process. These intrinsic physical properties may include, for example, the viscosity or the density. By continuously measuring an intrinsic physical property of the liquid rich stream, additional tracing compounds may not need to be added to the water treatment system. The treatment process may also include a holding tank, or a device that separates the entering water into two or more streams, such as a liquid stream and a biosolid stream.

9 Claims, 3 Drawing Sheets

METHODS FOR POLYMER ADDITION CONTROL FOR WATER TREATMENT

BACKGROUND

1. Field of the Invention

This invention relates to water treatment systems and, in particular, to systems and methods for dewatering and thickening operations within water treatment systems.

2. Description of the Related Art

During the treatment of water or wastewater, a residuals stream arising from, for example, a water treatment plant, a wastewater facility or an industrial process, may be dewatered or thickened to, for example, reduce the volume of liquid waste, or to produce a more solid waste for landfill. The residuals stream may be separated into a liquid-rich stream and a solid-rich ("cake") stream. The cake stream may be converted into fertilizer, or otherwise disposed of. The liquid-rich stream may also be referred to as a "centrate" or a "filtrate," depending on the separation technique used, in reference to centrifuges and filters, respectively. In some cases, a treatment agent may be added, for example, to promote aggregation of solid material for easier handling, separation, or disposal. The optimal amount of treatment agent may be a function of the solids content.

Techniques for adding treatment agent to a residuals stream have previously been disclosed in, for example, U.S. Pat. No. 5,620,609 by Field; U.S. Pat. No. 5,382,356 by Thogho et al.; Papavasilopoulos et al., *Wat. Sci. Tech.*, 38:33–40 (1998); Dentel et al., Wat. Res., 79:2663–2672 (1995); or Abu-Orf et al., Water Environment Federation, 67 Annual Conference & Exposition, Chicago, Ill. (1994). Another system to add treatment agent to a residuals stream has been disclosed in U.S. Pat. No. 5,645,799 by Shah et al.

SUMMARY OF THE INVENTION

This invention relates to systems and methods for dewatering operations within water treatment systems.

In one embodiment, a system to treat wastewater is provided, comprising a wastewater tank having an inlet and an outlet. The inlet of the wastewater tank is fluidly connected to a wastewater point of entry. The system also comprises a treatment agent inlet fluidly connected to the wastewater tank outlet. The inlet of the treatment agent is fluidly connected to a treatment agent point of entry. The system also comprises a rheological sensor, and a controller connected to the rheological sensor. The controller is programmed to regulate a flow of treatment agent through the treatment agent inlet.

In another embodiment, a system to treat wastewater is provided, comprising a wastewater tank having an inlet and an outlet. The inlet of the wastewater tank is fluidly connected to a wastewater point of entry. The system also comprises a means for dewatering wastewater having an inlet fluidly connected to the wastewater tank outlet. The system also comprises a treatment agent inlet fluidly connected to the means for dewatering wastewater inlet. The inlet of the treatment agent is fluidly connected to a treatment agent point of entry. The system also comprises a rheological sensor, and a controller connected to the rheological sensor. The controller is programmed to regulate a flow of treatment agent through the treatment agent inlet.

In yet another embodiment, a method to treat wastewater is provided, comprising the steps of providing a wastewater stream, adding a treatment agent to the wastewater stream, continuously measuring a rheological property of the wastewater stream, and adjusting a flowrate of the treatment agent based on the rheological property.

In still another embodiment, a method to treat wastewater is provided, comprising the steps of providing a wastewater stream, adding a treatment agent to the wastewater stream to produce a treated stream, separating the treated stream into a liquid-rich stream and a solid-rich stream, continuously measuring a rheological property of at least one of the liquid-rich stream and the solid-rich stream, and adjusting a flowrate of the treatment agent based on the rheological property.

Other advantages, novel features, and objects of the invention will become apparent from the following detailed description of the invention when considered in conjunction with the accompanying drawings, which are schematic and which are not intended to be drawn to scale. In the figures, each identical, or substantially similar component that is illustrated in various figures is represented by a single numeral or notation. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

Non-limiting embodiments of the present invention will be described by way of example with reference to the accompanying drawings in which.

DETAILED DESCRIPTION

Figure 1:
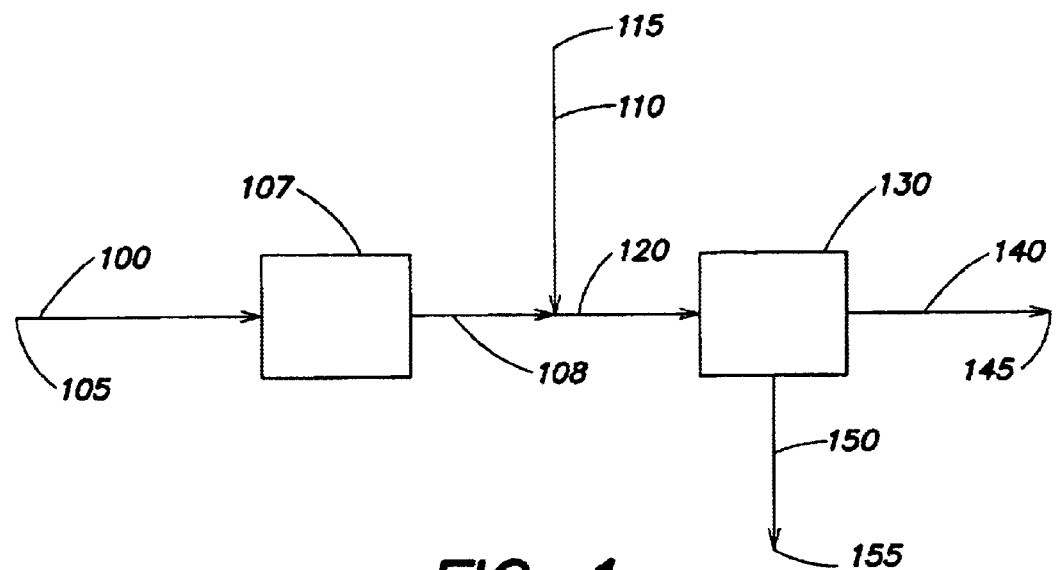
FIG. 1 is a schematic diagram of a wastewater treatment system.

In a water treatment process where flocculating agents are used to promote solids aggregation, intrinsic physical properties of the liquid rich stream may be continuously measured in order to control or optimize the amount of flocculating or treatment agent that is added to the process. These intrinsic physical properties may include, for example, the viscosity or the density. By continuously measuring an intrinsic physical property of the liquid rich stream, additional tracing compounds may not need to be added to the water treatment system. The treatment process may also include a holding tank, or a device that separates the entering water into two or more streams, such as a liquid-rich stream and a solid-rich stream.

The present invention may be used in any process where the treatment of water is desired, for example, as in a water treatment plant, a wastewater facility or an industrial process. As used herein, "wastewater" refers to any residuals stream that may contain solid or biosolid material, such as from a sewage treatment operation. Any volumetric flowrate may enter the wastewater treatment system, for example, an average flowrate of about 1000 gal/min, about 500 gal/min, or about 100 gal/min. The flowrate of fluid into the treatment system may be steady, periodic, or irregular, depending on the application. Other flowrates may be necessary in certain cases. In some cases, the fluid may first be collected into a holding vessel to, for example, control or regulate the flow of fluid through the treatment system, or dampen irregularities in the flowrate. Any holding vessel suitable for containing or storing the fluid may be used. As used herein, a "fluid" generally refers to a substance having flow properties, including slurries, semi-solid systems, or liquids containing solid or suspended components.

The entering residuals stream may arise from, for example, a municipal sewage plant, a water treatment plant, a septic tank, an industrial process, or the like. For example, in some embodiments, the invention may be used during the processing of wastewater from a city or municipality. The entering residuals stream may have any solids content, for example, less than about 10% solids. In some cases, the biosolid content may be approximately 2–5% solids. In other cases, other biosolid contents may be possible, such as about 15%. The physical properties of the entering residuals stream can vary with time, and different amounts of treatment agent may therefore be required to treat the entering residuals stream at different times. As an example of this variation, the viscosity of the liquid rich stream in a wastewater treatment plant, over a 24 hour time period, may vary erratically between, for example, about 1.2 cP and about 1.8 cP, or between about 1.4 cP and about 1.9 cP for a constant flocculent and residuals feed rate and without changing the operation of the separation device. This variation indicates the need for control and the usability of the viscosity as a flocculent feed controlling parameter.

The treatment agent added to the residuals stream may be any treatment agent. For example, the treatment agent may be a flocculating agent, a pH buffer, a fluid having a different temperature to control the temperature of the residuals stream, a disinfectant, a detoxification agent, a chelating agent, a chlorination agent, a bromination agent, an oxidant or a reductant, or the like. In some cases, the addition of treatment agent to the residuals stream may improve its handling characteristics, for example, by allowing or facilitating the separation of solid material out of the residuals stream, or by altering the temperature or the density of the residual stream.

Flocculating agents may be used in some embodiments of the invention to cause the aggregation of certain materials within the residuals stream into solid aggregates. The aggregates may then be removed in any separation process, for example, in a centrifugation or a filtration process. Any flocculating agent may be used in this invention. Examples of suitable flocculating agents include PERCOL™ 757, available from Ciba (Basel, Switzerland), polyaminoalkylmethacrylates, polyaminoalkylmethacrylates and their copolymers, polyacrylesteracrylamide copolymers, polyamines, polyethyleneimines, dicyandiamines, chitosans, polyacrylamides, polyethylene oxides, sodium polyacrylates, acrylamide-sodium acrylate copolymers, or carboxylmethyl celluloses.

FIG. 1 shows an example treatment process where an embodiment of the invention can be used. In this figure, residuals stream 100 arising from point of entry 105 is collected in holding tank 107. Treatment agent from treatment agent stream 110 arising from point of entry 115 is added to residuals stream 108 arising from tank 107, producing stream 120. The treatment agent may, for example, promote the aggregation or flocculation of material within the stream. Stream 120 enters separation device 130, which separates the aggregates into a solid-rich "biosolid" stream 150 and a liquid-rich stream 140. Stream 150, exiting though outlet 155, may be, for example, converted into fertilizer, sent downstream for further processing, or otherwise disposed of. Stream 140, exiting through outlet 145, may be, for example, further processed, purified or recycled for further treatment.

Figure 2:
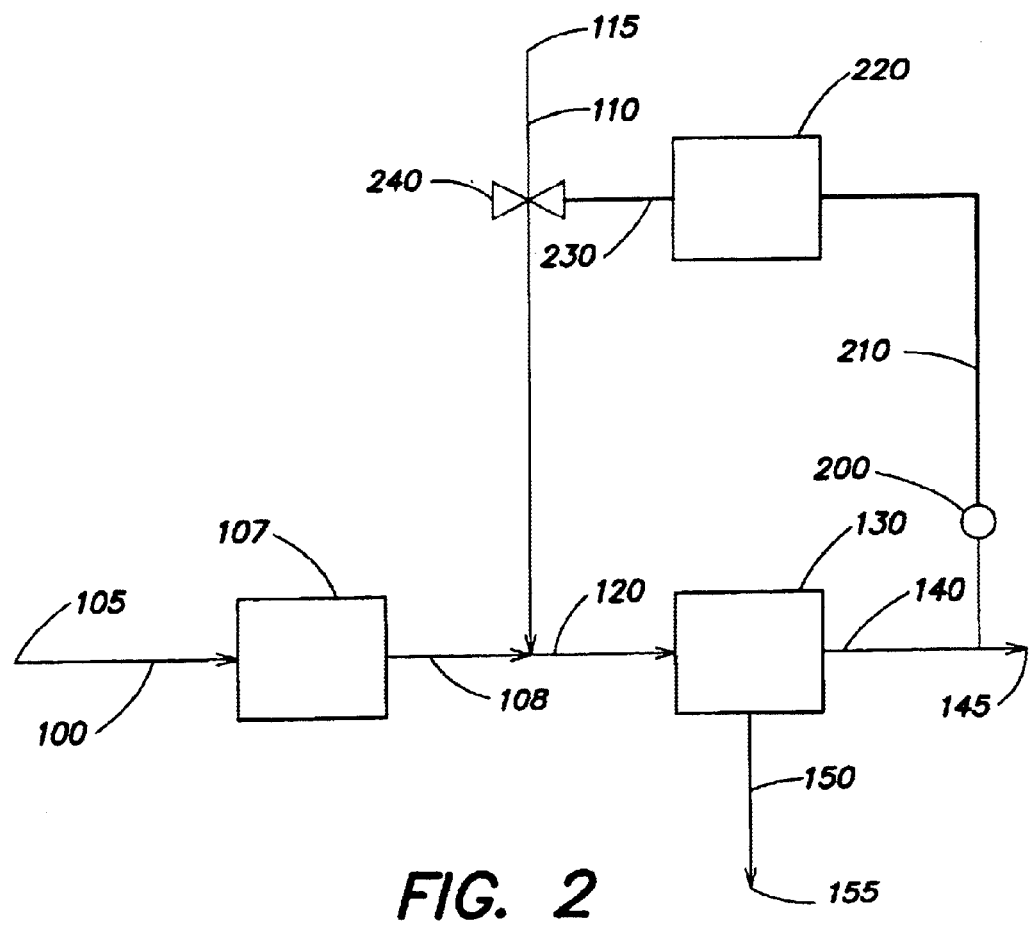
FIG. 2 is a schematic diagram of one embodiment of the invention, showing a sensor connected to a liquid-rich stream.

One embodiment of the invention is illustrated in FIG. 2. Fluid in residuals stream 100 arising from point of entry 105 is collected in holding tank 107. Fluid from residuals stream 108 arising from holding tank 107 mixes with treatment agent from treatment agent stream 110. The two fluids mix in stream 120. Stream 120 then enters separation device 130. Separation device 130 separates the entering fluids into a liquid-rich stream 140 and a solid-rich biosolid stream 150. Sensor 200, mounted on and fluidly connected to liquid-rich stream 140, produces a response based on a measured physical property of liquid-rich stream 140. Based on the measured rheological property of the stream, sensor 200 produces a signal, which is transmitted through signal line 210 to controller 220. Controller 220, using a preprogrammed algorithm, determines an appropriate response for device 240 to control the entering flow of treatment agent. Based on this determination, controller 220 transmits a signal through signal line 230 to device 240. Device 240, responding to the signal from controller 220, controls or regulates the flow of treatment agent entering point of entry 115 into treatment agent stream 110.

Figure 3:
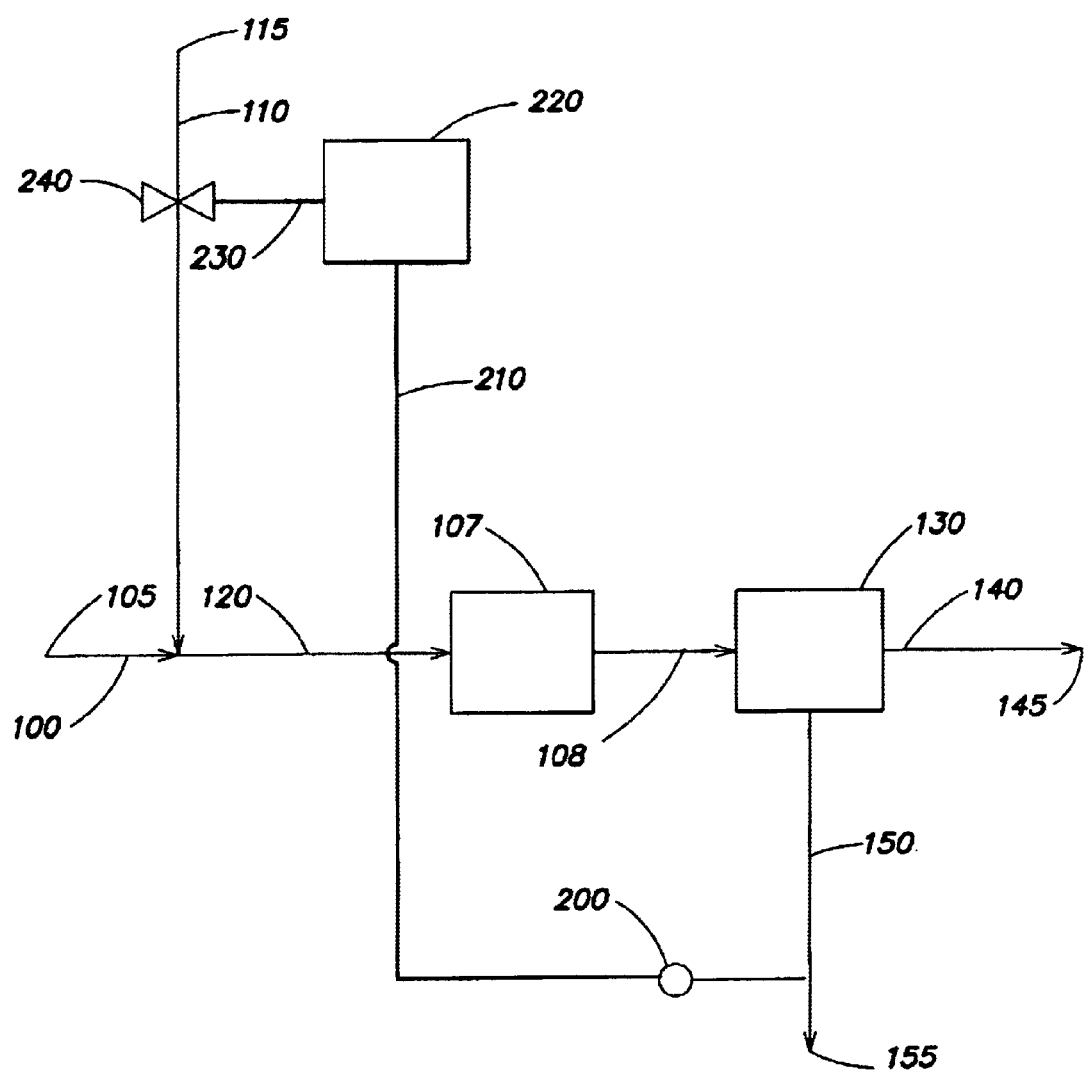
FIG. 3 is a schematic diagram of one embodiment of the invention, showing a sensor connected to a solid-rich stream.

FIG. 2 thus illustrates how one particular embodiment of this invention may be used to measure a physical property of liquid-rich stream 140 to control the addition of treatment agent in a feedback control system. It should be understood that the components of the invention may be rearranged as desired without departing from the scope of the invention. For example, sensor 200 can be positioned on solid-rich stream 150, as is shown in FIG. 3, or positioned on stream 120. FIG. 3 also illustrates an embodiment where mixed stream 120 enters holding tank 107. Other configurations of the invention are also possible. In certain cases, the components may be arranged in, for example, a feedforward control system.

Sensor 200 may be any sensor that can continuously measure a physical property of a stream, such as a rheological property. As used herein, "continuous" refers to processes where the sensor makes measurements instantaneously, rapidly or repeatedly. Of course, a certain amount of time lag may exist in the sensor, for example, in sensor systems where a brief integration time is needed, or in sensors where the computation of a parameter occurs. For example, the sensor may measure a rheological property. As used herein, "rheological properties" refers to the intrinsic measurable physical properties of the fluid or solid streams during flow, such as the viscosity and the density. As sensor 200 is able to continuously measure an intrinsic physical property of the stream, tracer compounds, which can be expensive, environmentally undesirable, or require additional processing steps for removal, may not need to be added to the treatment system.

For example, the sensor may be a viscometer. The viscometer may be any viscometer that can continuously measure the viscosity of a fluid, such as a rotational-based viscometer, or vibrational-based viscometers, or oscillation-type viscometers. The viscosity of the fluid may change proportionally with the amount of treatment agent in the liquid. In some embodiments, the viscosity may be used to indicate the optimal dosage of treatment agent. In certain embodiments of the invention, deposits from the process streams, such as, for example, centrate foam, may form on the viscometer. Thus, an automatic cleaning mechanism may be installed on the viscometer to prevent the buildup of deposits. In these embodiments, cleaning may be required, for example, daily or hourly. In other embodiments, the viscometer may not be affected by centrate or filtrate deposits, and thus, no automatic cleaning mechanism may be required.

Signal lines 210 and 230 may be any signal line that can transmit a signal from sensor 200 to controller 220, or controller 220 to device 240, respectively. The signal may be any suitable signal, for example, a pneumatic signal, an electrical signal, a mechanical signal, or the like. In some embodiments of the invention, electrical signals may be particularly suitable. Signal lines 210 and 230 do not necessarily have to transmit the same type signal. For example, signal 210 may be a pneumatic signal and signal 230 may be an electrical signal.

Controller 220 may be any system or mechanism that can detect the incoming signal from signal line 210, determine an appropriate response for device 240, and transmit a signal through signal line 230 to device 240, directing device 240 to give the appropriate response. Controller 220 may be, for example, a mechanical controller, a pneumatic controller, a computer, a semiconductor chip, or the like. Controller 220 may be a feedback or a feedforward controller. In some embodiments, the controller may be preprogrammed with an algorithm that determines an optimal flowrate of treatment agent into residuals stream 108. The algorithm may be any algorithm suitable for determining an appropriate response for device 240, for example, a Minimum Search Algorithm, a fuzzy logic algorithm, or an algorithm that determines an optimum based on historical data trends. Controller 220 may be a "hard-wired" system, or the controller may be programmable and adaptable as needed. The algorithm may be a predetermined algorithm or it may be an algorithm that may adapt with changing process conditions, such as in a process where the flow is pulsatile or randomly distributed.

Device 240 may be any device that can regulate the flow of treatment agent through treatment agent point of entry 115 into treatment agent stream 110. For example, device 240 may be a valve or a pump. In one embodiment, as an example, the throughput rate of a pump that is part of device 240 may be altered in response to a signal originating from controller 220. In another embodiment, the pump may be activated or deactivated in response to a signal originating from controller 220. In still other embodiments, a valve that is part of device 240 may be used to regulate the flow of treatment agent. For example, the valve may be a check valve, a gate valve, a diaphragm valve, a glove valve, a butterfly valve, or the like. In response to signals originating from controller 220, the valve may respond by fully opening and closing in some embodiments, or by partially opening and closing in other embodiments. Other methods for regulating the flow of treatment agent into treatment agent stream 110 may also be envisioned. For example, a concentration of treatment agent in stream 120 may be controlled by the appropriate addition of a diluent to the treatment agent stream.

It is to be understood that a variety of configurations may exist in the present invention. For example, multiple sensors or controllers may be used to control the flow of treatment agent into the system. Signals from outside of the system may also be used to control or help direct addition of treatment agent. For example, a process located upstream of point of entry 105 may transmit an appropriate signal to controller 220. Controller 220 may then use this information to determine an appropriate response for device 240. Thus, the treatment systems, as described herein, may be modified as desired for a particular process. In some cases, systems of the invention may include additional components than those illustrated; and, in some cases, systems of the invention may not include all of the illustrated components.

For example, the treatment system may include a device able to separate the residuals stream into a two streams, such as a liquid-rich stream and a solid-rich biosolid stream. For example, the separation device may be a vacuum filter, a filter press, a centrifugal separator, a belt press-type filter, a screw press, or the like.

The separation device may treat the entering fluid to produce a liquid-rich stream, which may contain, for example, less than about 0.5% solids, or, in some cases, less than about 0.1% solids. The liquid-rich stream may also be further processed in downstream unit operations. For example, the liquid-rich stream may be further purified, recycled for her treatment, discharged to the environment, or otherwise disposed of. The liquid-rich stream is also referred to as a "centrate" or a "filtrate," in reference to centrifuges and filters, respectively; these terms can be used interchangeably.

The materials in the biosolid stream may also undergo further processing, be discharged, or otherwise disposed of. For example, the biosolids may ultimately be converted into fertilizer, or stored for disposal in a landfill. The biosolid stream may also contain residual amounts of liquid. The dewatered or thickened stream may contain any concentration of solids. For example, the dewatered or thickened stream may contain greater than about 5% solids, greater than about 15% solids, or between about 18 and about 25% solids. In certain embodiments, the stream may contain between about 5% to about 7% solids, between about 40% and about 50% solids, or between about 20% and about 60% solids. Other solid concentrations are also possible.

It should be understood that alternative configurations of the invention may exist. For example, additional residuals or treatment streams may also enter into the system, or mixing of the residuals stream and the treatment agent stream may occur within separation device. The separation device may also produce additional streams other than the streams described above, or other unit operations may be located within the treatment system.

The function and advantages of these and other embodiments of the present invention will be more fully understood from the following examples. These examples are intended to be illustrative in nature and are not considered to be limiting the scope of the invention.

EXAMPLE

To determine the ability of an embodiment of the invention to optimize the treatment agent dose in a wastewater treatment system, the following experiment was conducted.

Dose-response testing was carried out in a wastewater treatment system in which the dose of a polymer used as a treatment agent for the wastewater biosolids entering the system was systematically varied; the resultant viscosity of the centrate, as measured continuously by the response of the viscometer, was recorded. The dose-response test establishes the response of the device to verify the correlation between the viscosity of the centrate and the optimal treatment agent flowrate. Initially, the wastewater was about 340 gal/min (21 L/s), the treatment agent feed was about 11.5 gal/min (0.73 L/s), and the centrate viscosity was about 1.05 cP. The treatment agent flowrate was increased to about 19.5 gal/min (1.23 L/s), equivalent to about 19.4 grams of treatment agent per kilogram of dry solid. The system was then allowed to stabilize for 30 min, and samples were collected for analysis.

This procedure was repeated using sequential increments in the dosage of treatment agent. The resultant continuous centrate viscosity measurements are shown in FIG. 4.

Figure 4:
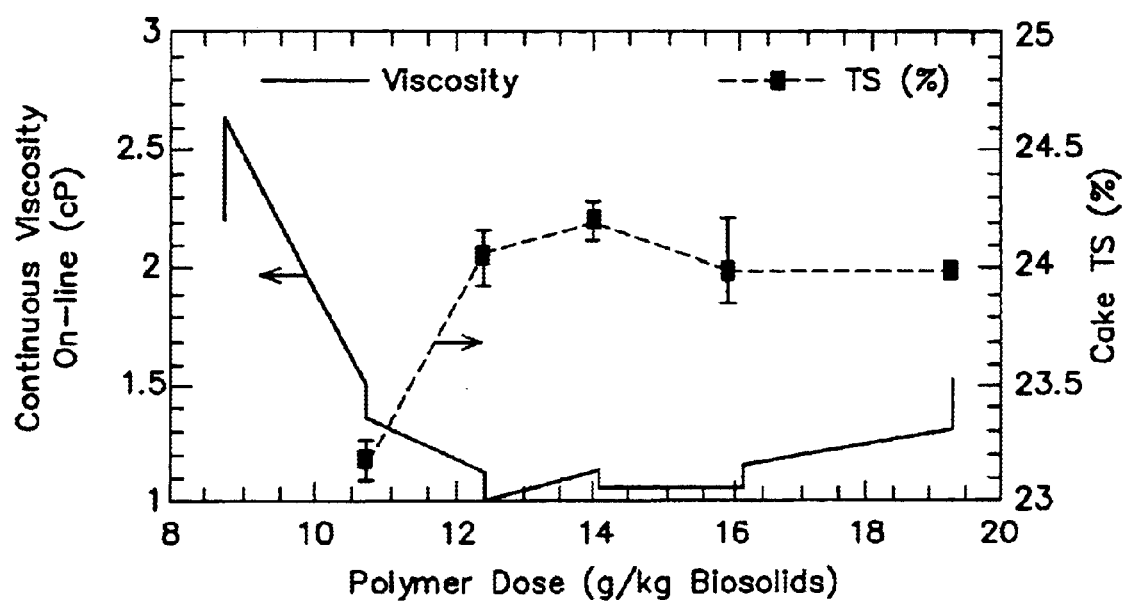
FIG. 4 is a graph of on-line viscosity and cake total solids content versus polymer dose in an experiment.

FIG. 4 shows that the centrate viscosity was highest at the maximum treatment agent doses that were applied to the wastewater treatment system. The centrate viscosity decreased as the treatment agent dose was decreased, reaching a minimum of about 0.998 cP at a treatment agent dosage of between 12 and 13 g/kg of biosolids. These dosages correspond to about maximum percent solids in the cake as shown in the figure. Thus, based on continuous measurements of the centrate viscosity, a minimum viscosity of the centrate indicates the optimum conditions for dewatering. The viscosity of the centrate increased with further decreases in treatment agent dosage. The high viscosity in the under-dosing region is due to the existence of solids not captured by the separation process due to the inefficiency of the flocculation processes. The high viscosity in the over-dosing region is due to residual polymer in the solution following optimum flocculation.

Thus, it has been demonstrated that an embodiment of the invention can be used to optimize the treatment agent dose in a wastewater treatment system.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition, any combination of two or more such features, systems or methods, if such features, systems or methods are not mutually inconsistent, is included within the scope of the present invention.

What is claimed is:

1. A method to treat wastewater, comprising:
providing a wastewater stream;
adding a treatment agent to the wastewater stream to produce a treated stream;
separating the treated stream into a liquid-rich stream and a solid-rich stream;
continuously measuring an on-line viscosity of the liquid-rich stream with a sensor fluidly connected to a liquid stream; and
adjusting a flowrate of treatment agent based on the on-line viscosity.

2. The method to treat wastewater of claim 1, wherein the step of adjusting a flowrate comprises adjusting a flowrate based on an optimization algorithm.

3. The method to treat wastewater of claim 1, wherein the step of adjusting a flowrate comprises adjusting a flowrate based on a record of the on-line viscosity of the liquid-rich stream.

4. The method to treat wastewater of claim 1, wherein the step of adding a treatment agent comprises adding a flocculating agent.

5. The method to treat wastewater of claim 1, wherein the step of adjusting a flowrate of the treatment agent occurs before the step of adding the treatment agent to the wastewater stream.

6. The method to treat wastewater of claim 1, wherein the step of separating the treated stream comprises separating the treated stream using a centrifuge.

7. The method to treat wastewater of claim 1, wherein the step of separating the treated stream comprises separating the treated tream using a filtration apparatus.

8. The method of claim 1, wherein the step of adjusting a flowrate of the treatment agent comprises determining a minimum value of the on-line viscosity.

9. The method of claim 1, wherein the step of adjusting a flowrate of the treatment agent comprises varying the flowrate of the treatment agent to determine a minimum value of the on-line viscosity.

* * * * *

UNITED STATES PATENT AND TRADEMARK OFFICE
CERTIFICATE OF CORRECTION

PATENT NO. : 6,849,190 B2
DATED : February 1, 2005
INVENTOR(S) : Mohammad Abu-Orf It is certified that error appears in the above-identified patent and that said Letters Patent is hereby corrected as shown below:

<u>Column 8,</u>
Lines 8-10, should read -- continuously measuring an on-line viscosity of the liquid-rich stream with a sensor fluidly connected to the liquid rich stream; and --

Signed and Sealed this

Tenth Day of May, 2005

JON W. DUDAS
*Director of the United States Patent and Trademark Office*